United States Patent [19]
Roesler et al.

[11] Patent Number: 5,346,680
[45] Date of Patent: Sep. 13, 1994

[54] SODIUM PERCARBONATE STABILIZED BY COATING

[75] Inventors: Richard Roesler, Kraainem, Belgium; Alfred Soentgerath, Hausen-Reuschenbach, Fed. Rep. of Germany; Werner Doetsch, Bad Hoenningen, Fed. Rep. of Germany; Gerd Hecken, Vettelschoss, Fed. Rep. of Germany

[73] Assignee: Solvay Interox GmbH, Hoellriegelskreuth, Fed. Rep. of Germany

[21] Appl. No.: 137,251

[22] Filed: Oct. 18, 1993

[30] Foreign Application Priority Data

Oct. 16, 1992 [DE] Fed. Rep. of Germany ....... 4234966
Aug. 10, 1993 [DE] Fed. Rep. of Germany ....... 4326804

[51] Int. Cl.$^5$ ................................. C01B 31/00
[52] U.S. Cl. ................... 423/274; 423/415.2
[58] Field of Search ................... 423/274, 415.2

[56] References Cited

U.S. PATENT DOCUMENTS

| | | | |
|---|---|---|---|
| 1,225,832 | 5/1917 | Liebknecht | 423/415.2 |
| 3,977,988 | 8/1976 | Tokiwa et al. | 423/415.2 |
| 4,117,087 | 9/1978 | Dillenburg et al. | |
| 4,131,562 | 12/1978 | Lutz et al. | 423/415.2 |
| 4,321,301 | 3/1982 | Brichard et al. | |
| 4,325,933 | 4/1982 | Matsumoto et al. | |
| 4,526,698 | 7/1985 | Kuroda et al. | |

FOREIGN PATENT DOCUMENTS

| | | |
|---|---|---|
| 2328803 | 1/1975 | Fed. Rep. of Germany . |
| 2622610 | 12/1976 | Fed. Rep. of Germany . |
| 2622458 | 12/1977 | Fed. Rep. of Germany . |
| 2800916 | 7/1978 | Fed. Rep. of Germany . |
| 2915980 | 11/1979 | Fed. Rep. of Germany . |
| 3321082 | 12/1983 | Fed. Rep. of Germany . |
| 282813 | 9/1990 | German Democratic Rep. . |
| 31839 | 8/1972 | Japan ............. 423/415.2 |
| 204806 | 11/1983 | Japan ............. 423/415.2 |
| 61-77607 | 4/1986 | Japan . |
| 1469352 | 4/1977 | United Kingdom . |

Primary Examiner—Wayne Langel
Attorney, Agent, or Firm—Evenson, McKeown, Edwards & Lenahan

[57] ABSTRACT

Sodium percarbonate particles stabilized by being coated with a solid coating material which contains a mixture of sodium carbonate and sodium chloride, optionally together with one or more auxiliary agents used in the manufacture of sodium percarbonate.

32 Claims, No Drawings

SODIUM PERCARBONATE STABILIZED BY COATING

BACKGROUND OF THE INVENTION

This invention relates to stabilization of sodium percarbonate by coating it with an inorganic coating material.

Sodium percarbonate is used as a bleaching component in detergents, bleaches and cleansers in powder form. It is characterized by a good solubility in water and rapid liberation of hydrogen peroxide and it is environmentally acceptable since its decomposition products do not pollute the environment.

One disadvantage of sodium percarbonate is its relatively poor stability when stored in the presence of typical detergent components. For this reason, numerous measures have been suggested to improve the stability of sodium percarbonate by incorporating stabilizing additives therein and/or by coating the sodium percarbonate particles with stabilizing layers. In published German Patent Application No. DE 2,622,610, for example, a coating with an inorganic coating material of sodium sulfate, sodium carbonate and sodium silicate is proposed. Published German Patent Application Nos. DE 2,800,916 and DE 3,321,082 disclose coatings with materials which contain boron compounds.

Despite prior efforts to produce such products, there remains a need in the art for sodium percarbonate which exhibits improved stability.

SUMMARY OF THE INVENTION

It is the object of the present invention to provide a coating material for sodium percarbonate which improves its storage stability in detergents.

Another object of the invention is to provide a stabilizing coating material for sodium percarbonate which has little or no adverse effect on the solubility of the sodium percarbonate.

A further object of the invention is to provide an environmentally acceptable process for coating sodium percarbonate particles in a stabilizing manner.

These and other objects of the invention are achieved by providing sodium percarbonate particles coated with a solid inorganic coating material wherein the coating material comprises a mixture of sodium carbonate and sodium chloride.

In accordance with a further aspect of the invention, the objects are also achieved by providing a process for producing stabilized sodium percarbonate particles coated with a solid inorganic coating material, said process comprising coating particles of sodium percarbonate with a coating material which comprises a mixture of sodium carbonate and sodium chloride by treating the particles to be coated with an aqueous liquid composition containing said coating material and thereafter drying the treated particles.

DETAILED DESCRIPTION OF PREFERRED EMBODIMENTS

The present invention is based on the discovery that sodium percarbonate can be stabilized in a particularly advantageous manner by a coating material containing sodium chloride and sodium carbonate.

The invention thus relates to sodium percarbonate particles coated with a solid inorganic coating material, which is characterized in that the coating material contains a mixture of sodium carbonate and sodium chloride and, optionally, auxiliary agents conventionally used in the manufacture of sodium percarbonate such as crystallization aids and/or stabilizers.

The present invention further relates to a process for producing sodium percarbonate particles coated in this way, which is characterized in that the sodium percarbonate particles are coated with the coating material by treating the sodium percarbonate particles with an aqueous coating agent which represents an aqueous solution or suspension of the components of the coating material and drying the particles treated with the aqueous coating agent.

A sodium percarbonate produced according to known processes which involve reacting sodium carbonate with hydrogen peroxide can be used as the sodium percarbonate. The sodium percarbonate to be treated according to the invention can thus be produced in accordance with methods known in the art by reacting soda ($Na_2CO_3$) with an aqueous hydrogen peroxide solution. For example, one conventional process for producing sodium percarbonate comprises reacting a hydrogen peroxide solution with a sodium carbonate solution or suspension, optionally with addition of a sufficient quantity of common salt to salt out the sodium percarbonate formed, separating the sodium percarbonate which crystallizes out from the mother liquor, and drying the separated sodium percarbonate. In general, concentrated hydrogen peroxide solutions and a concentrated aqueous solution or suspension of soda containing soda in quantities exceeding the saturation concentration are suitable for the production of sodium percarbonate. In particular, soda concentrations in the range from approximately 200 to 250 g/liter are suitable. It is also possible to add auxiliary agents commonly used in the manufacture of sodium percarbonate, such as crystallization aids and/or stabilizers, to the reaction mixture of soda and $H_2O_2$. Examples of conventional additives used in the production of sodium percarbonate include sodium polyphosphates such as sodium hexametaphosphate, sodium silicates such as water glass, sodium polycarboxylates, phosphonic acids such as 1-hydroxyethane-1,1-diphosphonic acid and the salts thereof and magnesium sulfate. Processes for producing sodium percarbonate by reacting aqueous soda solutions or suspensions containing suitable additives with hydrogen peroxide solutions, crystallization of the resulting sodium percarbonate, separation of the crystallized product from the mother liquor, and subsequent drying of the crystallized product are described in published German Patent Application Nos. DE 2,328,803 and DE 2,622,458, for example.

Granulated sodium percarbonate particles can also be produced according to conventional spray drying processes. In this case, the solution containing soda is generally initially combined with the hydrogen peroxide solution and, optionally, further additives to form a reaction mixture, and the resulting mixture is then introduced into the spray dryer. Another known process is the so-called spray granulation process (fluid bed spray drying) in which a mixture of a soda-containing solution with the hydrogen peroxide solution is sprayed onto sodium percarbonate seeds present in a fluid bed dryer. Sodium percarbonate can also be obtained in a known way by reacting solid sodium carbonate with a concentrated aqueous hydrogen peroxide solution in an intensive mixing facility, as described in East German Patent No. DD 282,813, for example.

The sodium percarbonate particles coated according to the invention generally contain at least 1 % by weight, preferably 2–12% by weight coating material based on the total weight of the coated particles. Coatings with 3–7% by weight coating material, based on the total weight of the coated particles, are particularly advantageous.

The main component of the coating material according to the invention is a mixture of sodium carbonate and sodium chloride. Advantageously, this mixture represents at least 80% by weight of the coating material. The sodium chloride is an essential component for achieving the processing properties of the coating material. Advantageously, a weight ratio of sodium carbonate to sodium chloride of 1:5 to 3:1, preferably of 1:4 to 2:1 is present in the mixture of sodium carbonate and sodium chloride. Weight ratios of 1:2 to 2:1 in the mixture of sodium carbonate/sodium chloride are particularly preferred.

In addition to the mixture of sodium carbonate and sodium chloride, the coating material optionally may contain other auxiliary agents conventionally used in the manufacture of sodium percarbonate. The proportion of such auxiliary agents should be a maximum of 20% by weight based on the total weight of the coating material. This means, it may be between 0 and 20% by weight of the coating material. Auxiliary agents which are commonly used in the manufacture of sodium percarbonate and which may be present in the coating material according to the invention include, for example, sodium polyphosphates, in particular sodium hexametaphosphate which may be present e.g. in quantities of 0 to 10% by weight, based on the weight of the coating material; sodium polycarboxylates, in particular sodium salts of acrylic acid polymers such as acrylic acid homopolymers or acrylic acid/maleic acid copolymers with a molecular weight in the range from 2,500 to 100,000, in particular sodium polyacrylates, which may be present in quantities of 0 to 10% by weight, based on the weight of the coating material; sodium silicates, preferably water glass with a ratio of $SiO_2$ to $Na_2O$ of 3.5:1 to 2:1, which may be present in quantities of 0 to 20% by weight, based on the weight of the coating material; phosphonic acids, in particular optionally hydroxy-substituted, lower alkane mono- or diphosphonic acids, such as 1-hydroxy ethane-1,1 diphosphonic acid or the salts thereof, which may be present e.g. in quantities of 0 to 5% by weight, based on the weight of the coating material; and water-soluble magnesium salts, particularly magnesium sulfate, which may be present in quantities of 0 to 10% by weight, based on the weight of the coating material. Besides the auxiliary agents mentioned here, all other auxiliary agents known to be suitable for the manufacture of sodium percarbonate obviously may be present in the coating material.

According to the invention, the sodium percarbonate particles coated with the coating material are prepared by treating them with an aqueous coating agent which comprises an aqueous solution or suspension of the components of the coating material and subsequently drying the particles which have been treated with the coating agent. In this process, it is possible to proceed either by first applying the aqueous coating agent to the particles and subsequently drying the particles which have been moistened with the coating agent, or by spraying the aqueous coating agent onto the particles in a fluid bed dryer through which a stream of warm air passes and simultaneously drying the particles.

In accordance with the process of the invention, the aqueous coating agent preferably is first applied to the sodium percarbonate particles to be coated in a mixer and these are subsequently dried, preferably in a fluid bed dryer. Advantageously, the aqueous coating agent is applied to the sodium percarbonate particles in a rapidly rotating projection or centrifugal mixer, which assures a good and rapid distribution of the aqueous coating agent on the particles which are to be coated and thus facilitates pressureless application of the aqueous coating agent. This is of advantage particularly if the aqueous coating agent comprises a suspension or a solution tending to crystallize and/or to form crusts. The temperature of the aqueous coating agent can vary as a function of its solids content and advantageously lies in the range from room temperature to 60° C. In this preferred variant of the process, relatively large quantities of the coating agent according to the invention can be applied to the sodium percarbonate particles, i.e. quantities corresponding to a moisture content of the mixture of up to 12 percent by weight (i.e. a calculated water content of the mixture of up to 12 percent by weight), without the mixture becoming excessively moist. Despite such high moisture contents in the mixture, only insignificant agglomerate formation occurs. It is thus possible according to the invention to apply unusually large quantities of coating material to the sodium percarbonate particles in a single coating step. The solids content (coating material) introduced with the coating agent may, for example, amount to as much as 7% by weight of the total solids content of the moist mixture (sodium percarbonate particles + coating material). The sodium percarbonate particles treated with the aqueous coating agent are advantageously dried to a residual water content of less than 1.5% by weight, preferably of less than 0.8% by weight. Drying can be carried out at drying temperatures in the range from 55° to 85° C., preferably from 65° to 80° C. If desired, the coating process can be repeated in order to apply larger quantities of coating material to the sodium percarbonate particles.

One particular advantage of the coating process according to the invention is found in coating sodium percarbonate particles which are manufactured by crystallization from a reaction mixture optionally containing common salt for salting out, so that besides the crystallized sodium percarbonate, a mother liquor is also obtained. Due to the residual solids content of the mother liquor from such a sodium percarbonate crystallization process, it can be used as a basic stock solution for preparing the aqueous coating agent to be used for coating and processed by adding sodium carbonate and/or sodium chloride into a coating material with the desired solids content and sodium carbonate/sodium chloride ratio, which can be used according to the invention. The content of common salt already present in the mother liquor for salting out of the sodium percarbonate is generally sufficient to assure the sodium chloride content necessary in the coating material, so that preferably only sodium carbonate needs to be added to the mother liquor in order to adjust the desired sodium carbonate content, e.g. in order to produce a particularly preferred coating material with a sodium carbonate/sodium chloride ratio of at least 1:2.

An aqueous coating agent produced from such a mother liquor may still contain up to a maximum of 2% by weight residual active oxygen. Optionally, a small proportion of this can be incorporated into the coating.

In order to obtain an aqueous coating agent suitable for coating the sodium percarbonate, it may be advantageous to increase the solids content of the mother liquor to the desired amount by adding soda and, optionally, common salt and/or other auxiliary agents commonly used in the manufacture of sodium percarbonate.

Advantageously, a suspension containing the coating material, sodium chloride and, optionally, auxiliary agents commonly used for producing sodium percarbonate, can also be used as aqueous coating agent. Such a suspension corresponds in terms of its composition to an aqueous sodium carbonate suspension suitable for the production of sodium percarbonate. Such a sodium percarbonate suspension can appropriately be obtained starting from the mother liquor formed in the crystallization process during sodium percarbonate manufacture by appropriately enriching this mother liquor with soda and, optionally, other auxiliary agents commonly used in the manufacture of sodium percarbonate.

Consequently, only substances already used in the production of sodium percarbonate are employed the stabilization of sodium percarbonate according to the invention by coating. The mother liquor obtained as a waste product during the production of sodium percarbonate can also be used for coating so that the need to dispose of the mother liquor is largely avoided. When using a coating agent corresponding in composition to the initial soda suspension used for manufacturing sodium percarbonate, a further advantage is that no separate coating agent needs to be manufactured and the same soda suspension can be used as the starting material for producing sodium percarbonate and as the coating agent for the sodium percarbonate obtained.

The sodium percarbonate particles coated according to the invention exhibit satisfactory stability during storage in admixture with the usual detergent components, and their rate of dissolution in water is substantially unaffected by the coating.

The following examples are intended to illustrate the invention in further detail without, however, restricting its scope.

The rates of dissolution in water given in the following examples were determined in a known manner in a 2-liter container equipped with a stainless steel stirrer which in turn is equipped with a shaft with 2 vertical agitator blades 42 mm long and 11 mm high and a motor with an output of 350 rpm, the shaft being isolated with polyethylene at the mounting to the engine. In order to determine the dissolution rate, two grams of test substance were introduced into 1 liter of demineralized water at 15° C. and stirred. The amount of dissolved substance was determined through measuring the electrical conductivity of the solution.

The residual water contents indicated in the examples were determined in a known manner by weighing a 10 gram specimens into a 100 ml round-bottomed flasks and drying them for 2 hours at 60° C. under a reduced pressure of 5 torr and subsequently determining the weight loss.

EXAMPLE 1

Coating of sodium percarbonate 2.5 kg sodium percarbonate were introduced into a mixing device (Lodige laboratory mixer type MSR). 460 g of the following coating liquid A heated to 40° C. were added at an operating speed of 260 rpm.

Aqueous coating solution A:

NaCl content: 230.6 g/l
$Na_2CO_3$ content: 118.3 g/l
Solids content: 28.6 wt-%
Density: 1.22 g/ml The addition time was 100 seconds, and the mixture was mixed further for an additional mixing time of 60 seconds. The mixture had a moisture content of 11.1% by wt. The solids content of the quantity of coating agent introduced into the mixture was 5% by weight based on the total solids content of the mixture.

Subsequently the moist mixture was dried in a laboratory fluid bed dryer at a discharge air temperature of 75° to 80° C. The dried coated sodium percarbonate particles were obtained in the form of a free-flowing dry product having the following properties:

Active oxygen content: 13.01 wt-%
Residual water content: 1.1 wt-%
Agglomerate formation: Content of agglomerates with a diameter of more than 1000 μm: 3.3 wt-%
Rate of dissolution in water (measured at a concentration of 2 g/l and a temperature of 15° C.): 95% by wt. dissolved after 2 minutes.

EXAMPLE 2

Coating of sodium percarbonate

As described in Example 1, 2.5 kg sodium percarbonate were mixed with 270 g of coating solution A. The mixture had a moisture content of 7.0% by weight. The solids content of the amount of coating agent introduced into the mixture was 3% by weight based on the total solids content of the mixture. The free-flowing dry product obtained after drying of the mixture had the following properties:

Active oxygen content: 13.29 wt-%
Residual water content: 0.9 wt-%
Agglomerate formation: Content of agglomerates with a diameter of more than 1000 μm: 0.9% by wt.
Rate of dissolution in water (measured at a concentration of 2 g/l and a temperature of 15° C.): 95% by wt. dissolved after 2 minutes.

EXAMPLE 3

Coating of sodium percarbonate 2.5 kg sodium percarbonate were mixed with 417 g of the following coating solution B (temperature 20° C.) according to the method described in Example 1.

Aqueous coating solution B:

NaCl content: 236 g/l
$Na_2CO_3$ content: 59 g/l
$H_2O_2$ content: 11.8 g/l
Solids content: 25 wt-%
Density: 1.18 g/ml The mixture had a moisture content of 10.7% by weight. The solids content of the amount of coating agent introduced into the mixture was 4% by weight based on the total solids content of the mixture.

The free-flowing dry product obtained after drying of the moist mixture had the following properties:

Active oxygen content: 13.19 wt-%
Residual water content: 0.83 wt-%
Agglomerate formation: Content of agglomerates with a diameter of more than 1000 μm: 3.1% by wt.
Rate of dissolution in water (measured at a concentration of 2 gl and a temperature of 15° C.): 96% by wt. dissolved after 2 minutes.

EXAMPLE 4

Coating of sodium percarbonate 2.5 kg of sodium percarbonate were mixed with 436 g of the following coating suspension C (temperature 20° C.) following the method described in Example 1.

Aqueous coating solution C:
NaCl content: 230 g/l
$Na_2CO_3$ content: 250 g/l
Sodium hexametaphosphate content: 3 g/l
Solids content: 366 g/kg suspension
Density: 1.32 g/ml The mixture had a moisture content of 9.4% by weight. The solids content of the amount of coating agent introduced into the mixture was 6% by weight based on the total solids content of the mixture.

The free-flowing dry product obtained after drying of the moist mixture had the following properties:
Active oxygen content: 13.05 wt-%
Residual water content: 0.76 wt-%
Agglomerate formation: Content of agglomerates with a diameter of more than 1000 μm: 2.3% by wt.
Rate of dissolution in water (measured at a concentration of 2 g/l and a temperature of 15° C.): 96% by wt. dissolved after 2 minutes.

EXAMPLE 5

Manufacture and coating of sodium percarbonate

A) Manufacture of sodium percarbonate

At a temperature of 45° C., an aqueous soda suspension (I) was prepared which contained, per liter, 250 g sodium carbonate, 230 g sodium chloride, 3 g sodium hexametaphosphate and an amount of water glass corresponding to 2.4 g/l $SiO_2$ (from a water glass solution with a % $SiO_2$:% $Na_2O=3.4$). One liter of this soda suspension and 0.134 liter of an aqueous hydrogen peroxide solution containing, 902 g $H_2O_2$ and 2 g 1-hydroxyethane-1,1-diphosphonic acid per liter were added dropwise to 400 ml of an aqueous sodium chloride solution containing 230 g/l NaCl. The addition of the soda suspension and the hydrogen peroxide solution was adjusted in such a way that a molar ratio of sodium carbonate to hydrogen peroxide of 1.1 to 1.4 was maintained in the reaction mixture. During the reaction, the temperature was maintained at approximately 17° C.

On completion of the addition, a further quantity of the water glass solution corresponding to 2 g $SiO_2$ was added to the reaction mixture, and the resulting sodium percarbonate suspension was cooled to 10° C. The crystallized product was subsequently separated out. The remaining mother liquor contained 69 g sodium carbonate, 180 g sodium chloride, 0.06 g $SiO_2$, 0.04 g phosphorus and 1.3 g active oxygen, per liter, and had a density of 1.18 kg/l.

B) Preparation of the coating agent

The mother liquor obtained in process stage A was used as a stock solution for preparing the coating agent. By adding further quantities of solids, the solution was adjusted to have a content of 250 g/l sodium carbonate, 230 g/l sodium chloride, 3 gl sodium hexametaphosphate and 2.4 g/l $SiO_2$ (in the form of water glass). The density of the resulting suspension was approximately 1.32 kg/l, the solids content was 369 g/kg. This coating agent thus corresponded in its composition to a soda suspension suitable for use in the production of sodium percarbonate.

C) Coating of the sodium percarbonate

Following the method described in Example 1, 2.5 kg of sodium percarbonate were mixed with 432 g of the coating agent prepared in process stage B and heated to 45° C. The mixture had a moisture content of 9.3% by weight. The solids content of the quantity of coating agent introduced into the mixture was 6% by weight based on the total solids content of the mixture.

The free-flowing dry product obtained after drying of the moist mixture had the following properties:
Active oxygen content: 13.15 wt-%
Residual water content: 0.15 wt-%
Agglomerate formation: Content of agglomerates with a diameter of more than 1000 μm: 0.4% by wt.
Rate of dissolution in water (measured at a concentration of 2 g/l and a temperature of 15° C.): 96% by wt. dissolved after 2 minutes.

EXAMPLE 6

Coating of sodium percarbonate 2.5 kg of sodium percarbonate were mixed with 436 g of the following coating suspension D (temperature 45° C.) following to the method described in Example 1.

Aqueous coating solution D:
NaCl content: 230 g/l
$Na_2CO_3$ content: 250 g/l
Sodium salt of a maleic acid/ acrylic acid copolymer (average molecular weight 70,000): 3 g/l
Solids content: 366 g/kg suspension
Density: 1.32 g/ml The mixture had a moisture content of 9.4% by weight. The solids content of the amount of coating agent introduced into the mixture was 6% by weight based on the total solids content of the mixture.

The free-flowing dry product obtained after drying of the moist mixture had the following properties:
Active oxygen content: 13.20 wt-%
Residual water content: 0.5 wt-%
Agglomerate formation: Content of agglomerates with a diameter of more than 1000 μm: 2.3% by wt.
Rate of dissolution in water (measured at a concentration of 2 g/l and a temperature of 15° C.): 99% by wt. dissolved after 2 minutes.

EXAMPLE I

Stability test

To investigate the stability of the coated sodium percarbonate particles in the presence of detergent components, the coated sodium percarbonate granules prepared in the above examples and, for comparison, uncoated sodium percarbonate particles were introduced into a base powder of a commercial grade zeolite-containing compact detergent in a quantity corresponding to 2% by weight active oxygen (based on the resulting overall mixture). Subsequently, the decomposition of the percarbonate which accompanies the loss of active oxygen was determined for this overall mixture at 40° C. by measuring the heat flow (μW/g) associated therewith in a micro-calorimeter. A high heat flow corresponds to a high rate of decomposition.

The results are indicated in the following table and show that the sodium percarbonates coated according to the invention have an extremely low rate of decomposition and are highly compatible with the detergent components.

TABLE

| Material of Example No. | Rate of Decomposition determined as heat flow ($\mu W/g$) |
|---|---|
| 1 | 19 |
| 2 | 22 |
| 3 | 31 |
| 4 | 10 |
| 6 | 15 |
| uncoated starting material | 60 |

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Sodium percarbonate particles coated with a solid inorganic coating material wherein the coating material comprises a mixture of sodium carbonate and sodium chloride.

2. Sodium percarbonate particles according to claim 1, wherein the coating material comprises at least 1 wt-% of the coated sodium percarbonate particles.

3. Sodium percarbonate particles according to claim 2, wherein the coating material comprises from 2 to 12 wt-% of the coated sodium percarbonate particles.

4. Sodium percarbonate particles according to claim 3, wherein the coating material comprises from 3 to 7 wt-% of the coated sodium percarbonate particles.

5. Coated sodium percarbonate particles according to claim 1, wherein at least 80 wt-% of the coating material is comprised of said mixture of sodium carbonate and sodium chloride.

6. Coated sodium percarbonate particles according to claim 1, wherein said mixture comprises a weight ratio of sodium carbonate to sodium chloride in the range from 1:5 to 3:1.

7. Coated sodium percarbonate particles according to claim 6, wherein said mixture comprises a weight ratio of sodium carbonate to sodium chloride in the range from 1:4 to 2:1.

8. Sodium percarbonate particles according to claim 1, wherein said coating further comprises at least one auxiliary agent selected from the group consisting of sodium polyphosphates, sodium polycarboxylates, sodium silicates, phosphonic acids and salts thereof, and magnesium sulfate.

9. Coated sodium percarbonate particles according to claim 8, wherein the coating material contains up to a maximum of 20 wt-% of said auxiliary agents.

10. A process for producing stabilized sodium percarbonate particles coated with a solid inorganic coating material, said process comprising coating particles of sodium percarbonate with a coating material which comprises a mixture of sodium carbonate and sodium chloride by treating the particles to be coated with an aqueous liquid composition containing said coating material and thereafter drying the treated particles.

11. A process according to claim 10, wherein said aqueous liquid composition is an aqueous solution of said coating material.

12. A process according to claim 10, wherein said aqueous liquid composition is an aqueous suspension of said coating material.

13. A process according to claim 10, wherein said coating material further comprises at least one auxiliary agent selected from the group consisting of sodium polyphosphates, sodium polycarboxylates, sodium silicates, phosphonic acids and salts thereof, and magnesium sulfate.

14. A process according to claim 10, wherein said aqueous liquid composition has a solids content of at least 20 wt-%.

15. A process according to claim 14, wherein said aqueous liquid composition has a solids content of from 25 to 45 wt-%.

16. A process according to claim 15, wherein said aqueous liquid composition has a solids content of from 30 to 40 wt-%.

17. A process according to claim 10, wherein in said drying step the treated particles are dried to a residual water content of less than 1.5 wt-%.

18. A process according to claim 17, wherein in said drying step the treated particles are dried to a residual water content of less than 0.8 wt-%.

19. A process according to claim 10, wherein the particles of sodium percarbonate are coated with a sufficient amount of coating material such that the coating material comprises at least 1 wt-% of the coated particles.

20. A process according to claim 19, wherein the particles of sodium percarbonate are coated with a sufficient amount of coating material such that the coating material comprises from 2 to 12 wt-% of the coated particles.

21. A process according to claim 20, wherein the particles of sodium percarbonate are coated with a sufficient amount of coating material such that the coating material comprises from 3 to 7 wt-% of the coated particles.

22. A process according to claim 10, wherein at least 80 wt-% of the coating material is comprised of said mixture of sodium carbonate and sodium chloride.

23. A process according to claim 10, wherein said mixture comprises a weight ratio of sodium carbonate to sodium chloride in the range from 1:5 to 3:1.

24. A process according to claim 23, wherein said mixture comprises a weight ratio of sodium carbonate to sodium chloride in the range from 1:4 to 2:1.

25. A process according to claim 10, wherein the coating material comprises at least 80 wt-% of said mixture of sodium carbonate and sodium chloride and up to a maximum of 20 wt-% of at least one auxiliary agent selected from the group consisting of sodium polyphosphates, sodium polycarboxylates, sodium silicates, phosphonic acids and salts thereof, and magnesium sulfate.

26. A process according to claim 10, wherein said aqueous liquid composition comprises a mother liquor obtained from the manufacture of sodium percarbonate by reacting an aqueous solution or suspension of sodium carbonate with a hydrogen peroxide solution in the presence of sufficient sodium chloride for salting out.

27. A process according to claim 26, wherein said mother liquor is obtained from the manufacture of sodium percarbonate by reacting aqueous sodium carbonate with a hydrogen peroxide solution in the presence of sodium chloride and at least one auxiliary agent selected from the group consisting of sodium polyphosphates, sodium polycarboxylates, sodium silicates, phosphonic acids and salts thereof, and magnesium sulfate.

28. A process according to claim 26, wherein said mother liquor contains up to a maximum of 2 wt-% active oxygen.

29. A process according to claim 26, wherein said aqueous liquid composition is adjusted to have a solids content of at least 20 wt-% by adding sodium carbonate to said mother liquor.

30. A process according to claim 29, wherein said aqueous liquid composition is adjusted to have a solids content of at least 20 wt-% by adding to said mother liquor sodium carbonate and at least one auxiliary agent selected from the group consisting of sodium polyphosphates, sodium polycarboxylates, sodium silicates, phosphonic acids and salts thereof, and magnesium sulfate.

31. A process according to claim 29, wherein said aqueous liquid composition is adjusted to have a solids content of from 25 to 45 wt-%.

32. A process according to claim 31, wherein said aqueous liquid composition is adjusted to have a solids content of from 30 to 40 wt-%.

* * * * *